(12) United States Patent
Boyer et al.

(10) Patent No.: US 10,239,018 B2
(45) Date of Patent: Mar. 26, 2019

(54) EXHAUST GAS REAGENT VAPORIZATION SYSTEM

(71) Applicant: Sisu Energy & Environmental, LLC, Tulsa, OK (US)

(72) Inventors: Thomas W. Boyer, Collinsville, OK (US); Scott A. Taylor, Broken Arrow, OK (US); John R. Shaw, Tulsa, OK (US); Phil Childers, Tulsa, OK (US)

(*) Notice: Subject to any disclaimer, the term of this patent is extended or adjusted under 35 U.S.C. 154(b) by 0 days.

(21) Appl. No.: 15/649,335

(22) Filed: Jul. 13, 2017

(65) Prior Publication Data

US 2019/0015782 A1    Jan. 17, 2019

(51) Int. Cl.
*B01D 53/94* (2006.01)
*B01D 53/90* (2006.01)
*B01J 35/12* (2006.01)

(52) U.S. Cl.
CPC .......... *B01D 53/9418* (2013.01); *B01D 53/90* (2013.01); *B01D 2255/70* (2013.01); *B01J 35/12* (2013.01)

(58) Field of Classification Search
CPC ........ B01D 53/74; B01D 53/76; B01D 53/79; B01D 53/90; B01D 2202/00; B01D 2258/0283; B01D 2259/122; B01D 2259/124; F28F 1/00; F01N 5/02; F01N 3/05; F01N 2240/02; F01N 2270/00; F01N 2610/102; F01N 2610/10
See application file for complete search history.

(56) References Cited

U.S. PATENT DOCUMENTS

| 5,437,851 | A  | * | 8/1995  | MacInnis    | B01D 53/79   |
|-----------|----|---|---------|-------------|--------------|
|           |    |   |         |             | 422/171      |
| 5,585,072 | A  | * | 12/1996 | Moskal      | B01D 53/56   |
|           |    |   |         |             | 110/216      |
| 6,449,947 | B1 | * | 9/2002  | Liu         | B01D 53/9431 |
|           |    |   |         |             | 60/286       |
| 6,601,385 | B2 | * | 8/2003  | Verdegan    | B01D 53/8631 |
|           |    |   |         |             | 60/274       |
| 7,509,799 | B2 | * | 3/2009  | Amou        | B01D 53/9431 |
|           |    |   |         |             | 60/286       |
| 7,849,676 | B2 | * | 12/2010 | Witte-Merl  | F01N 3/2066  |
|           |    |   |         |             | 60/274       |
| 9,062,582 | B2 | * | 6/2015  | Loman       | F01N 3/206   |
| 2006/0234173 | A1 | * | 10/2006 | Smith    | F23J 15/003  |
|           |    |   |         |             | 431/5        |
| 2015/0260071 | A1 | * | 9/2015  | Reichert | F01N 3/2066  |
|           |    |   |         |             | 423/239.1    |

FOREIGN PATENT DOCUMENTS

| BR | 11 2013 009 358 | * | 8/2016  | ............. F01N 3/206  |
| CA |      2125753 C  | * | 11/1999 | ............. B01D 53/79  |
| CN | 10 3079680 A    | * | 5/2013  | ......... B01D 53/8631    |
| DE | 10 2011 116 227 | * | 4/2013  | ......... F01N 3/2066     |
| WO | WO 2011 156 496 A2 | * | 12/2011 | ...... B01D 53/8631    |

* cited by examiner

*Primary Examiner* — Timothy C Vanoy
(74) *Attorney, Agent, or Firm* — Brent Capehart

(57) ABSTRACT

The present invention provides for a reagent vaporization system. The reagent vaporization system includes a vaporization chamber located within a stream of hot exhaust gas. An aqueous reagent source located outside of the stream of hot exhaust gas provides aqueous reagent to the vaporization chamber. The heat from the hot exhaust gas vaporizes the aqueous reagent, which is then introduced into the stream of hot exhaust gas.

3 Claims, 6 Drawing Sheets

EXHAUST GAS REAGENT VAPORIZATION SYSTEM

BACKGROUND OF THE INVENTION

Field of the Invention

The present invention is generally directed toward reagent vaporization, and more specifically, toward a reagent vaporization system utilizing exhaust gas.

Background

Combustion exhaust gas, otherwise referred to as flue gas, is emitted as a result of the combustion of fuels such as natural gas, gasoline, petrol, diesel fuel, fuel oil, or coal. Typically contained within the combustion exhaust gas are particulates of nitrogen oxides (NOx), a pollutant. The introduction of a reagent such as ammonia or urea into the flue gas in conjunction with a catalyst can produce a reaction with the nitrogen oxides to produce nitrogen gas. The reagent can be introduced into the stream of flue gas in a vapor state.

The prior art has a number of various vaporization processes, including systems that utilize direct contact with hot exhaust gas to vaporize aqueous reagent. These systems utilize a hot fan assembly to induce flow of hot exhaust gas to an external vaporizer chamber and then reinject the combined exhaust gas/vaporized reagent into the stream of exhaust gas. These systems have the disadvantage of having high initial costs related to the hot fan and high long term costs to maintain the external components. The prior art further includes systems that utilize external electrically generated heat. These systems have the disadvantage of having high long term costs relating to the maintenance and ongoing power requirements.

Clearly, there is a need for an improved reagent vaporization system.

BRIEF SUMMARY OF THE INVENTION

The present invention satisfies the needs discussed above. The present invention is generally directed toward reagent vaporization, and more specifically, toward a reagent vaporization system utilizing exhaust gas.

One aspect of the present invention is directed toward a reagent vaporization system. This system includes a vaporization chamber located within a stream of hot exhaust gas. Aqueous reagent is provided to the vaporization chamber from an external source located outside of the stream of the hot exhaust gas. In this aspect, the stream of hot exhaust gas heats the aqueous reagent located within the vaporization chamber area until vaporization. The vaporized reagent is then introduced into the stream of hot exhaust gas. The aqueous reagent source may include a reagent storage and pump; and a reagent flow control rack.

Another aspect of the present invention may also include a dilution air heating coil located within the stream of hot exhaust gas. The dilution air heating coil may be located either upstream or downstream of the vaporization chamber. Dilution air is provided to the dilution air heating coil from a dilution air apparatus located outside of the stream of hot exhaust gas. The dilution air apparatus may include an ambient dilution air blower.

It is to be understood that the invention is not limited in its application to the details of the construction and arrangement of parts illustrated in the accompanying drawings. The invention is capable of other embodiments and of being practiced or carried out in a variety of ways. It is to be understood that the phraseology and terminology employed herein are for the purpose of description and not of limitation.

Upon reading the above description, various alternative embodiments will become obvious to those skilled in the art. These embodiments are to be considered within the scope and spirit of the subject invention, which is only to be limited by the claims which follow and their equivalents.

DESCRIPTION OF THE INVENTION

The present invention satisfies the needs discussed above. The present invention is generally directed toward reagent vaporization, and more specifically, toward a reagent vaporization system utilizing exhaust gas.

Figure 1:
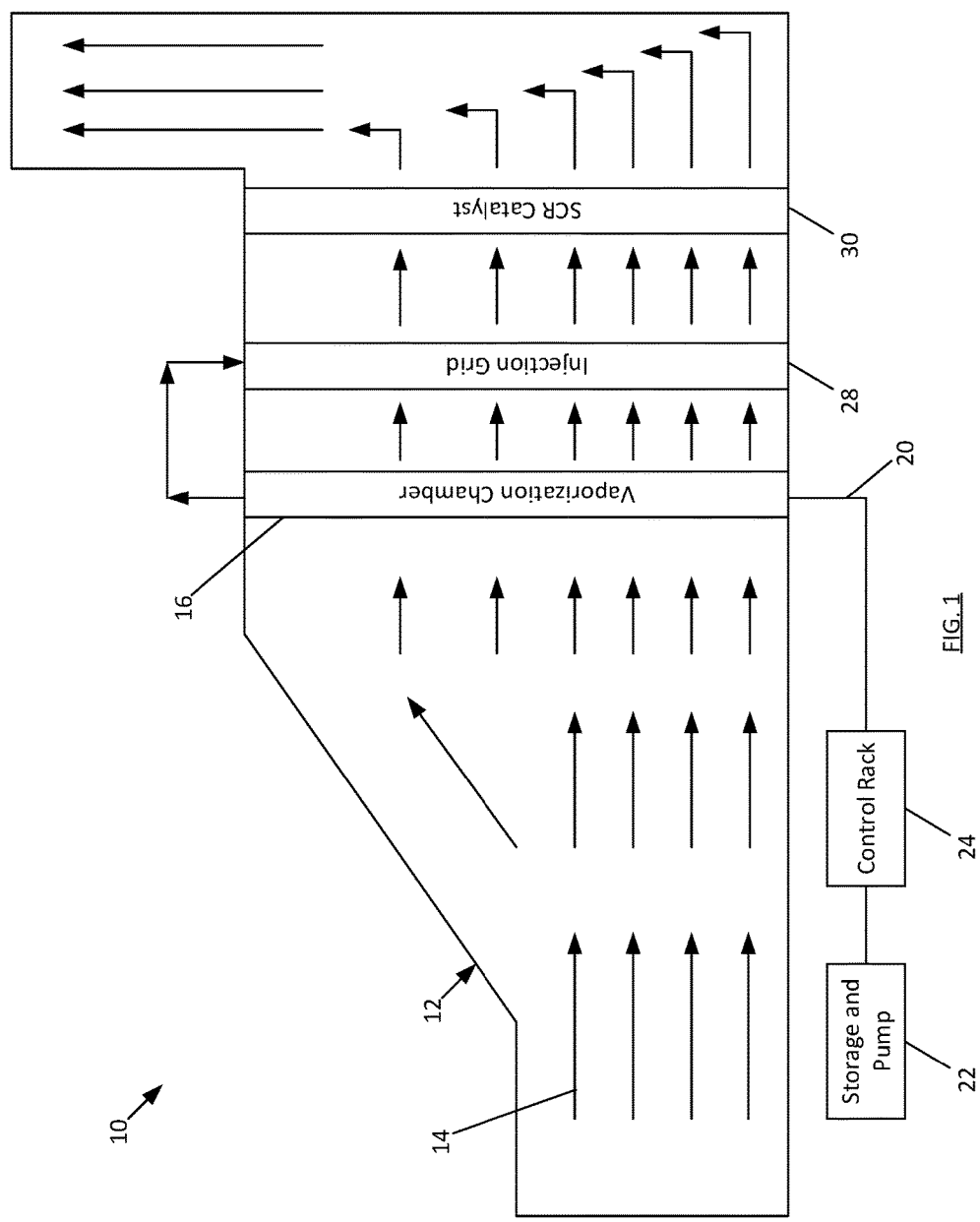
FIG. 1 is a schematic illustration of an embodiment of the present invention.

An embodiment 10 of the present invention is illustrated in FIG. 1. Embodiment 10 discloses an exhaust gas channel 12 having a stream of exhaust gas 14 flowing therethrough. A vaporization chamber 16 is inside the exhaust gas channel 12 and within the stream of hot exhaust gas 14. An aqueous reagent source 20 is located outside of the exhaust gas channel 12 and stream of hot exhaust gas 14. The aqueous reagent source 20 is in communication with the vaporization chamber 16 and provides aqueous reagent thereto. The heat from the exhaust gas heats up the vaporization chamber 16 which causes the aqueous reagent therein to vaporize without coming in direct contact with the exhaust gas. Due to vaporization chamber 16 being within the exhaust gas flow, the footprint required by a traditional reagent vaporizer system that utilizes either hot gas or electric heat is significantly reduced. In this embodiment, aqueous reagent is not meant to be limiting. Those skilled in the art will recognize that any fluid that can cause a catalytic reaction with the exhaust gas is within the scope of this invention.

An embodiment of the vaporization chamber 16 may comprise one or more atomizing nozzles configured to transform the aqueous reagent into a mist. The atomization of the aqueous reagent increases the surface area of the fluid, which allows for more efficient heat absorption to achieve vaporization. This embodiment may also comprise a static mixing system configured to disperse the atomized reagent. The static mixing system may include a plurality of fixed baffles configured to induce turbulence within the atomized reagent.

Figure 2:
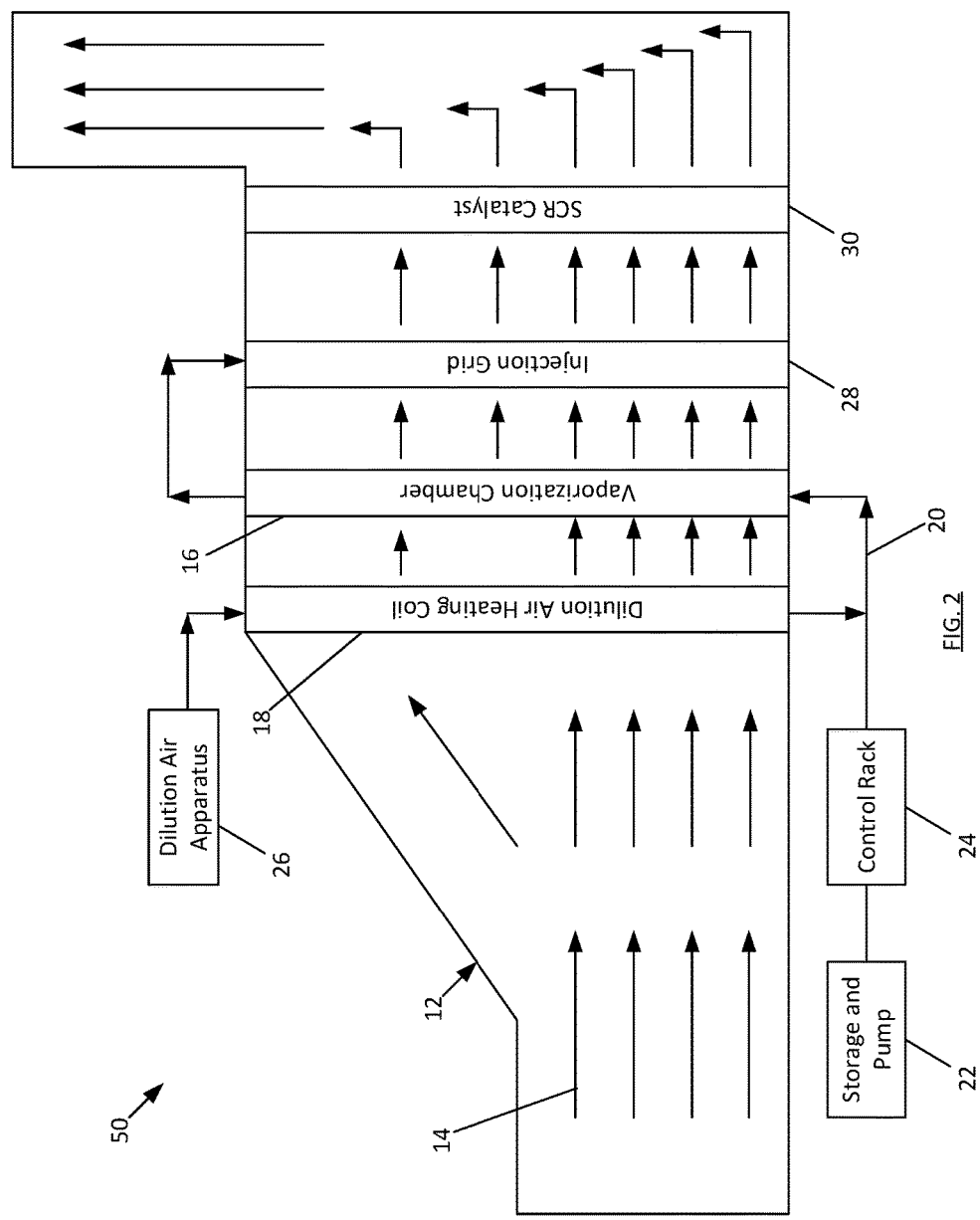
FIG. 2 is a schematic illustration of a second embodiment of the present invention.

Another embodiment 50 of the present invention is illustrated in FIG. 2. The vaporization chamber of embodiment 10 is disclosed and may also comprise a dilution air heating coil 18 located within the stream of hot exhaust gas 14 and upstream from the vaporization chamber 16. Ambient dilution air may be provided to dilution air heating coil 18 by a dilution air apparatus 26 which is located outside of the exhaust gas channel 12 and stream of hot exhaust gas 14. Further, dilution air apparatus 26 is located upstream of all heat transfer surfaces of the dilution air heating coil 18. This will allow for the reduction of costs and maintenance associated with hot fans. The dilution air apparatus 26 may be a dilution air blower. The location of dilution air heating coil 18 being upstream of vaporization chamber 16 is illustrative and not meant to be limiting. Those skilled in the art will recognize that dilution air heating coil 18 may be located downstream of vaporization chamber 16.

This embodiment 50 may also comprise a reagent injection grid 28 located downstream from, and in communication with, the vaporization chamber 16. Reagent injection grid 28 may inject vaporized reagent into the stream of exhaust gas 14. Further downstream, the stream of exhaust gas may engage a SCR catalyst 30 which causes the NOx to convert into nitrogen gas. The location of reagent injection grid 28 and SCR catalyst 30 being downstream of vaporization chamber 16 is illustrative and not meant to be limiting. Those skilled in the art will recognize that reagent injection grid 28 and SCR catalyst 30 may be located upstream of vaporization chamber 16.

Figure 3:
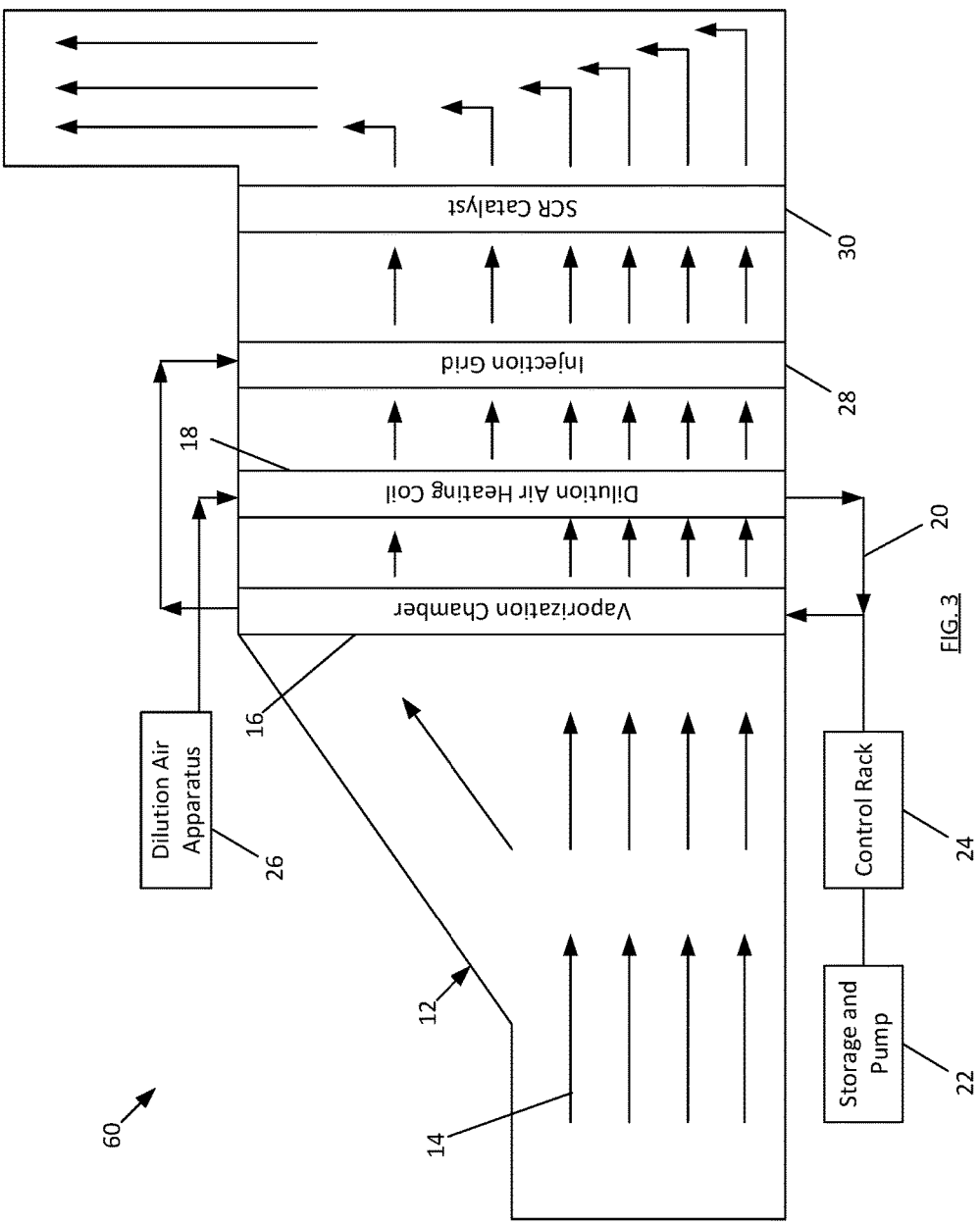
FIG. 3 is a schematic illustration of a third embodiment of the present invention.

An embodiment 60 of the present invention is illustrated in FIG. 3. Embodiment 60 discloses a vaporization chamber 16 as set out embodiment 10 but being located in the stream of hot exhaust gas 14 upstream from dilution air heating coil 18.

Figure 4:
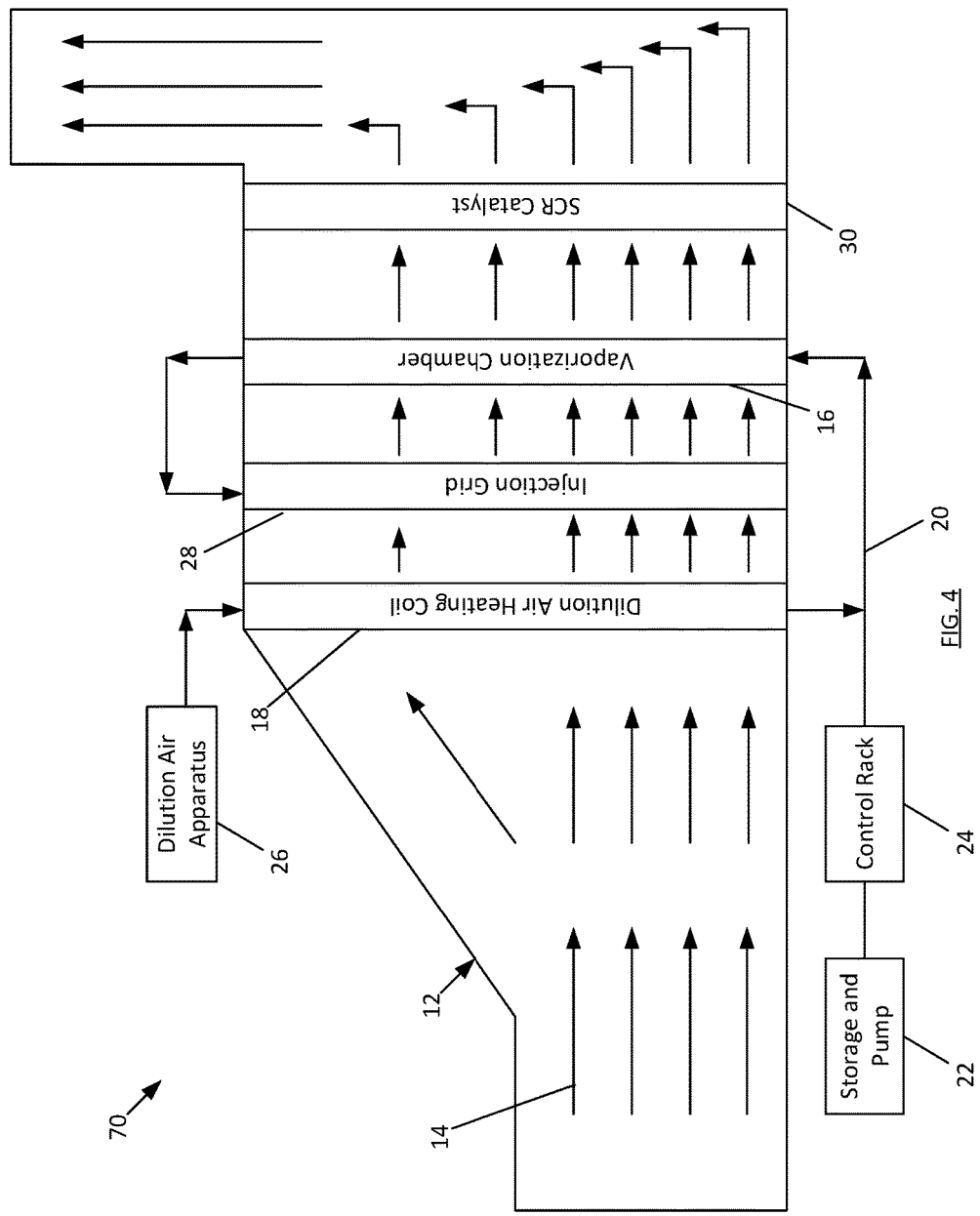
FIG. 4 is a schematic illustration of a fourth embodiment of the present invention.

An embodiment 70 of the present invention is illustrated in FIG. 4. Embodiment 70 discloses a vaporization chamber 16 as set out embodiment 10 but being located in the stream of hot exhaust gas 14 downstream of reagent injection grid 28 and upstream from the SCR catalyst 30.

Figure 5:
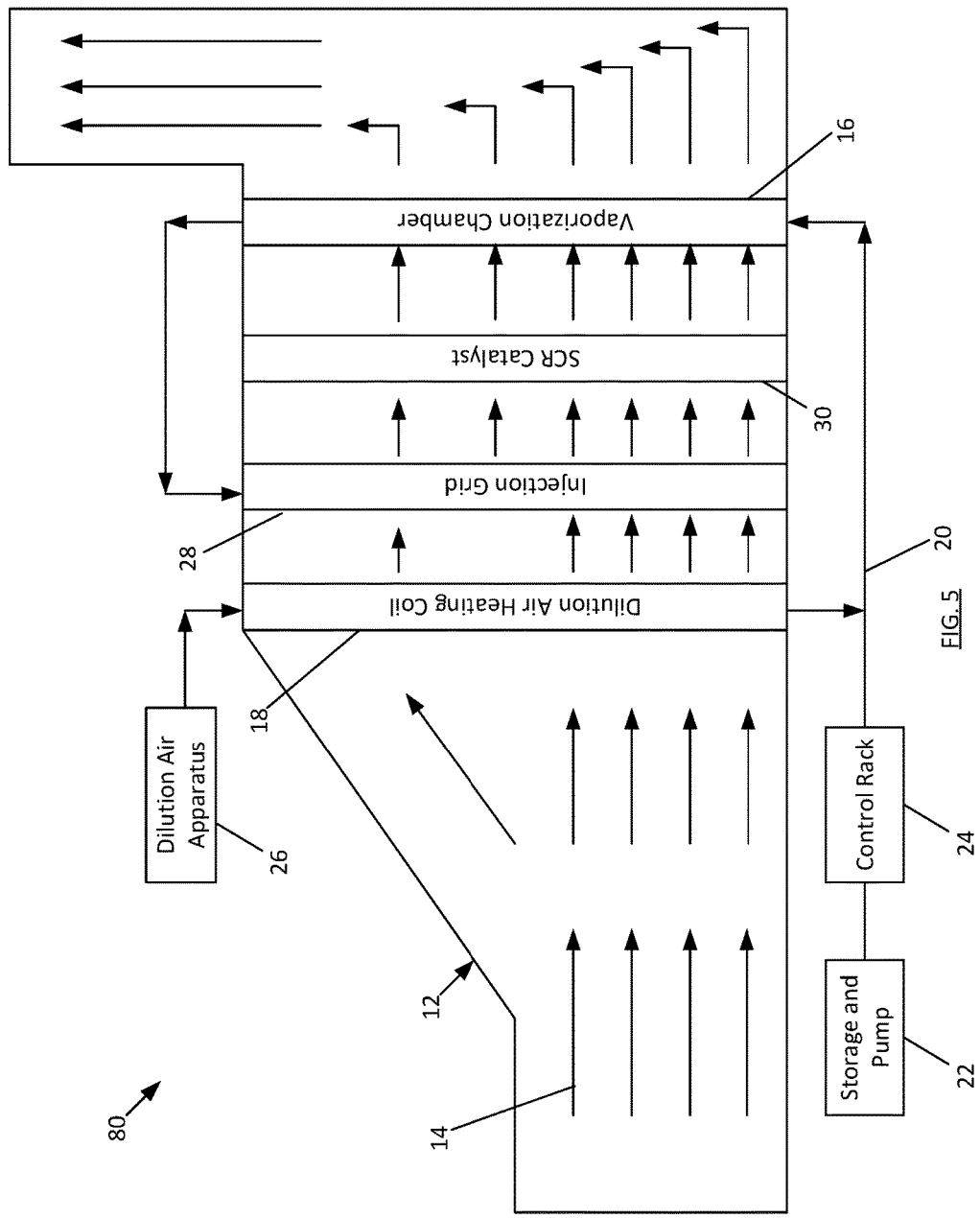
FIG. 5 is a schematic illustration of a fifth embodiment of the present invention.

An embodiment 80 of the present invention is illustrated in FIG. 5. Embodiment 80 discloses a vaporization chamber 16 as set out embodiment 10 but being located in the stream of hot exhaust gas 14 downstream of the SCR catalyst 30.

Figure 6:
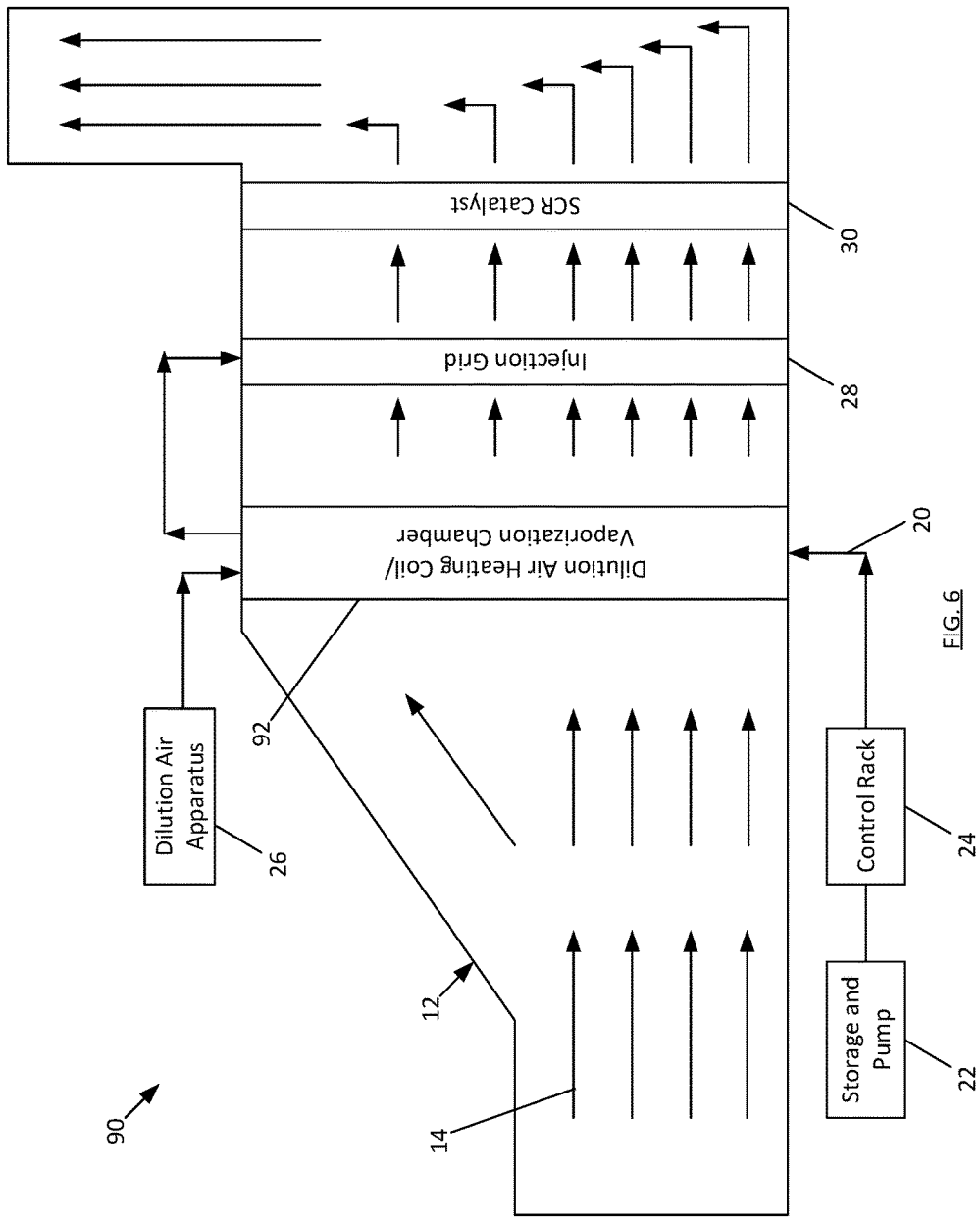
FIG. 6 is a schematic illustration of a sixth embodiment of the present invention.

An embodiment 90 of the present invention is illustrated in FIG. 6. Embodiment 90 discloses a combined vaporization chamber/dilution air heating coil 92.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification.

What is claimed:

1. A vaporization system comprising:
    a vaporization chamber located within a stream of hot exhaust gas;
    a reagent source located outside of the stream of hot exhaust gas and in communication with the vaporization chamber providing aqueous reagent thereto;
    a dilution air heating coil located within the stream of hot exhaust gas; and
    a dilution air apparatus located outside of the stream of hot exhaust gas,
    wherein hot exhaust gas heats the surfaces of the vaporization chamber causing vaporization of the aqueous reagent,
    wherein the dilution air heating coil is located downstream of the vaporization chamber.

2. A vaporization system comprising:
    a vaporization chamber located within a stream of hot exhaust gas; and
    a reagent source located outside of the stream of hot exhaust gas and in communication with the vaporization chamber providing aqueous reagent thereto, wherein hot exhaust gas heats the surfaces of the vaporization chamber causing vaporization of the aqueous reagent,
    the vaporization chamber having one or more atomizing nozzles being configured to transform the reagent into a mist,
    the vaporization chamber having a static mixing system configured to disperse the atomized reagent.

3. The vaporization system of claim 2, wherein the static mixing system comprises a plurality of fixed baffles configured to induce turbulence within the atomized reagent.

\* \* \* \* \*